United States Patent [19]
Fujinawa et al.

[11] Patent Number: 5,668,656
[45] Date of Patent: Sep. 16, 1997

[54] LIGHT SUPPLYING OPTICAL DEVICE

[75] Inventors: Nobuhiro Fujinawa; Masayuki Inami, both of Kanagawa-ken; Eisaku Maeda, Chiba-ken, all of Japan

[73] Assignee: Nikon Corporation, Tokyo, Japan

[21] Appl. No.: 305,322

[22] Filed: Sep. 15, 1994

[30] Foreign Application Priority Data

Dec. 13, 1993 [JP] Japan .................................. 5-341995

[51] Int. Cl.$^6$ .................................................. G02B 26/08
[52] U.S. Cl. ........................ 359/208; 359/204; 359/900; 362/296; 362/347; 355/67
[58] Field of Search .................................. 347/225, 232, 347/238, 241, 256; 362/296–299, 347, 350, 800; 358/474, 494, 497; 359/196, 204–208, 900, 831, 833, 834, 837; 355/67, 70

[56] References Cited

U.S. PATENT DOCUMENTS

| | | | |
|---|---|---|---|
| 4,868,383 | 9/1989 | Kurtz et al. | 250/228 |
| 5,191,406 | 3/1993 | Brandestini et al. | 358/22 |

Primary Examiner—James Phan
Attorney, Agent, or Firm—Oliff & Berridge

[57] ABSTRACT

In order to provide an approximately straight line of light on an original document that is to be read, for example, by an image reading system, a light-supplying optical device includes a light source that produces a bow-shaped (i.e., curved) line of light in order to nullify the line bow phenomenon caused by an optical member such as, for example, a toric mirror that reflects the light towards the original document.

38 Claims, 7 Drawing Sheets

LIGHT SUPPLYING OPTICAL DEVICE

BACKGROUND OF THE INVENTION

1. Field of the Invention

The present invention relates to a light-supplying optical device that can be used, for example, in an image input device that reads image information through photoelectric conversion.

2. Description of Related Art

Figure 6:
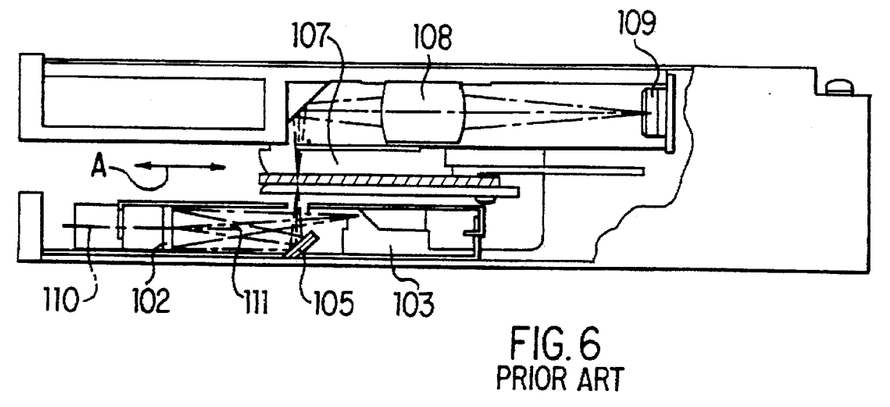
FIG. 6 is a side view showing an example of a conventional image reading system having a conventional light-supplying optical device.
Figure 7:
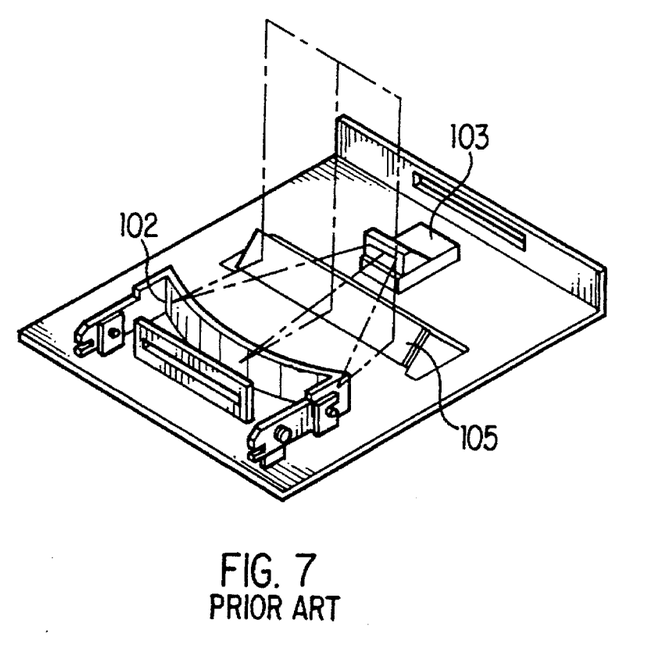
FIG. 7 is a perspective view showing an example of the FIG. 6 conventional light-supplying optical device.
Figure 8A:
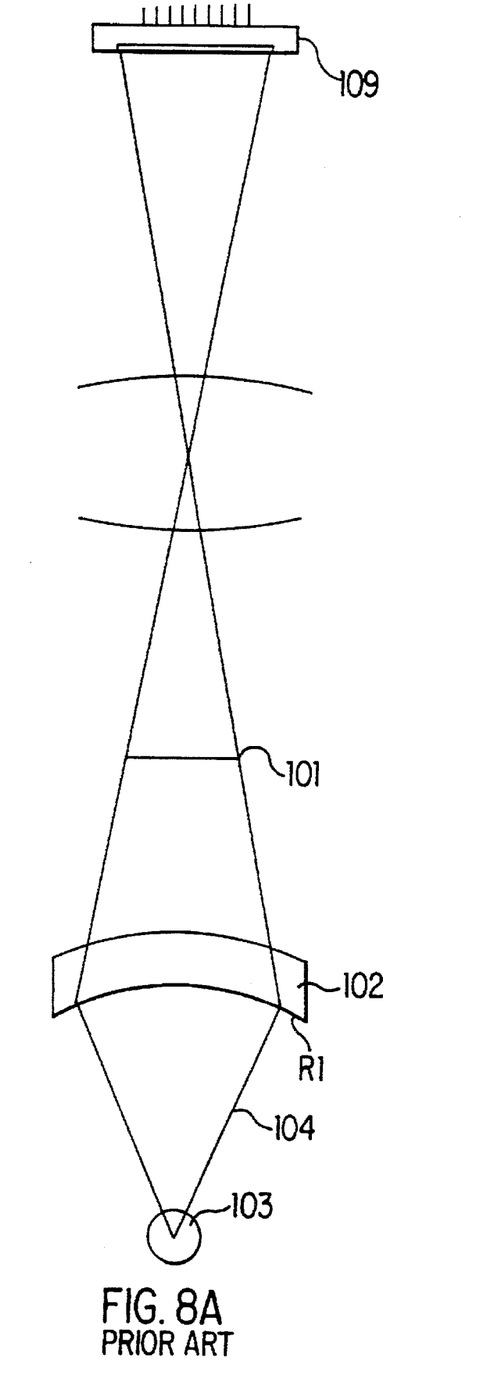
FIGS. 8A and 8B are a top view and a side view, respectively, showing an example of a light ray path through a conventional light-supplying optical device.
Figure 8B:
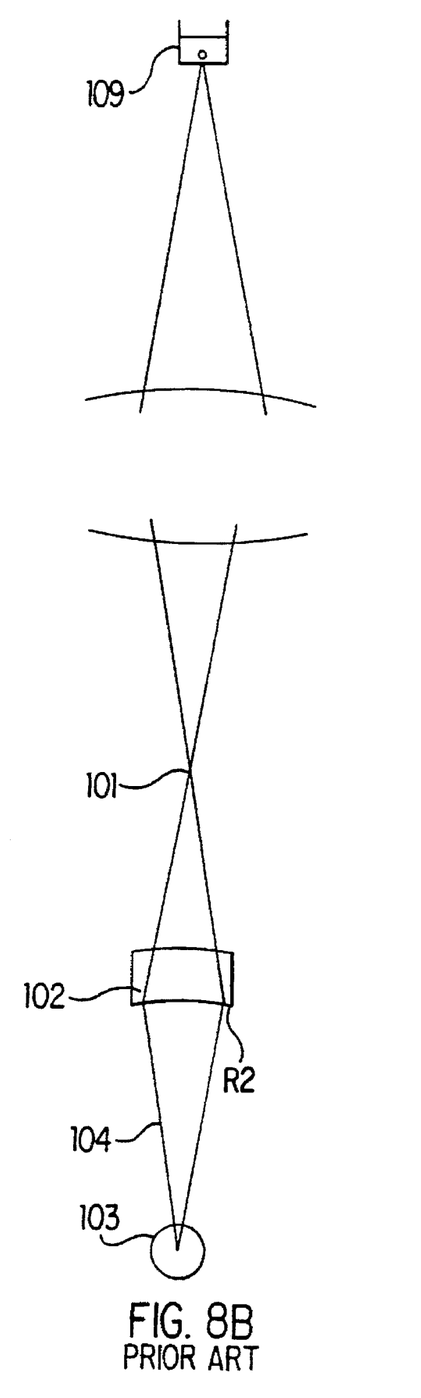

FIG. 6 shows a conventional image input device. The light-supplying optical device of the image input device is shown in FIG. 7. The light-supplying optical device shown in FIG. 7 has a basic optical arrangement as shown in FIGS. 8A–8B; however, the optical path is altered through the use of two mirrors 102 and 105 to enable its containment within a limited space.

In FIG. 7, two optical path changing mirrors are provided, one of which is comprised of a toric mirror 102. As shown in FIG. 8A, which is a modified top view of FIG. 7, light rays emitted from a light source 103 are reflected by the toric mirror 102, which is provided with a curvature R1 to illuminate a single line of light onto the surface of an original document 101 (such as a transparency, for example). (Actually, as shown in FIG. 7, the light reflected by toric mirror 102 reflects from optical path changing mirror 105, prior to illuminating the original document.) In addition, as shown in FIG. 8B, the image of the light source 103 is formed, by means of a curvature R2, into an image on the surface of the original document 101. The toric mirror 102 uses curvature R1 (which extends in a plane parallel to the surface of the original document 101) to collect the light rays emitted by source 103 in one direction, and uses curvature R2 (which extends in a plane perpendicular to the surface of the original document 101) to collect the light rays emitted by source 103 in a direction perpendicular to the direction in which the light rays are collected by curvature R1.

As shown in FIG. 6, light rays emitted from the light source 103 are incident on the toric mirror 102, at an angle 111 relative to the axis 110 of the toric mirror so that the light rays are reflected toward the subsequent optical path changing mirror 105. The light rays reflected by the toric mirror 102 are formed into an image on the surface of the original document 101 after reflection by the optical path changing mirror 105. This arrangement prevents the light rays between source 103 and toric mirror 102 from interfering with the light rays between toric mirror 102 and optical path changing mirror 105.

The image information of the original document illuminated by the light rays is formed into an image on a linear image sensor 109 (which can be, for example, a charge coupled device CCD) by means of a photographic lens 108, for example. By causing a holder 107 that holds the original document to move in the direction indicated by the arrow A in FIG. 6, all of the information in the original document can be read in succession by the linear image sensor 109.

Figure 9A:
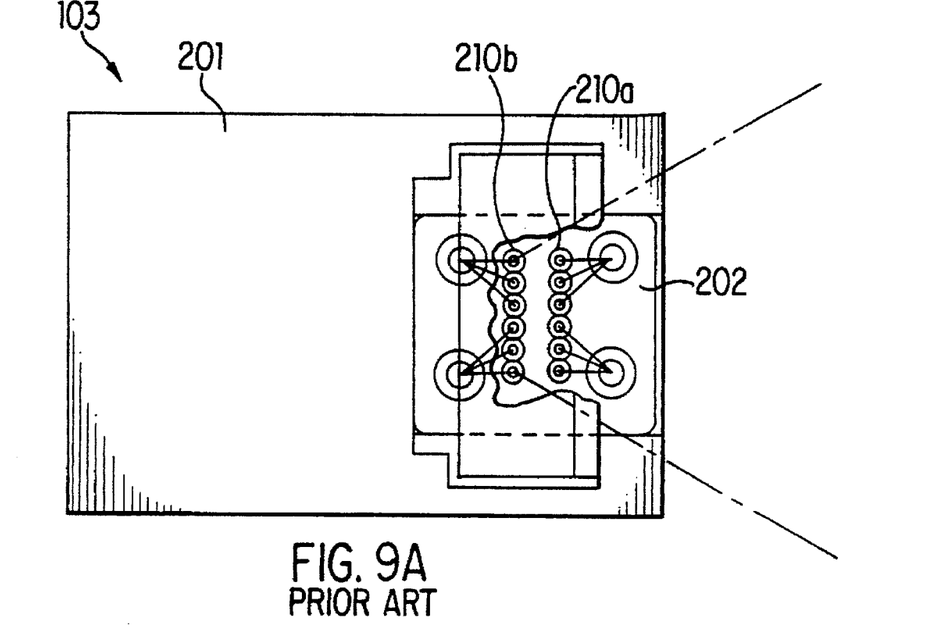
FIGS. 9A and 9B are a top view and a side view, respectively, showing an example of a light source in a conventional light-supplying optical device.
Figure 9B:
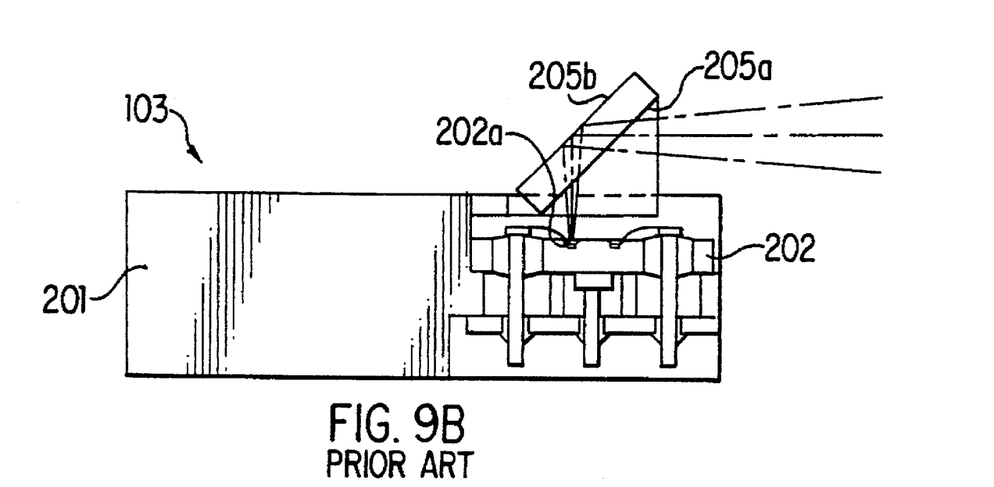

The light source 103 has the structure shown in FIGS. 9A–9B. A stem 202 is soldered onto a light source base 201. On top of the stem, multiple point light producing components such as LED chips 210a, 210b are arranged in rows, and are bonded to the stem. Around each LED chip is formed a conical reflector 202a that reflects light emitted in the sideways direction from the LEDs and projects the light upward (FIG. 9B) from the LED chips.

In order to emit light in three colors, the light source 103 is composed of two rows of LED chips 210a and 210b, with blue LEDs that produce a small quantity of light per chip arranged in one row 210a (in this example, six LEDs are provided in row 210a) and with the other row 210b comprised of red LEDs and green LEDs arranged in a GRGGRG pattern. The light from LED chips 210a and 210b, after being reflected by the reflector 202a and projected upward from the chips (FIG. 9B), is reflected by a blue-reflecting membrane 205a or by a wholly reflective mirror 205b, formed at a certain angle and with a specified spacing, and is emitted frontwards (to the right in FIGS. 9A and 9B, and to the left in FIG. 6), and is collected by the toric mirror 102 so as to form a line on the surface of the original document as detailed above.

The light emitted from the blue LEDs is reflected by the blue-reflecting membrane 205a, while the light emitted from the red LEDs and green LEDs is reflected by the wholly reflective mirror 205b, so that when viewed from the front of the light source it appears that the three colors of light have all been produced in the same position. Switching between the red, green and blue colors is controlled electrically, making high speed reading of the original document possible.

With the described conventional light-supplying optical device, the incidental light rays form an angle 111 with the axis 110 of the toric mirror so that the light rays 104 emitted from source 103 to toric mirror 102 do not interfere with the light rays reflected by the toric mirror 102 and so that optical path changing mirror 105 does not interfere with the light rays 104 between source 103 and toric mirror 102. However, since the toric mirror has the curvatures R1 and R2, the angle at which the light is reflected differs between the center and the perimeter of the toric mirror 102. As a result, the light image projected on the surface of the original document 101 is bowed instead of being a perfectly straight line, creating the so-called line bow phenomenon.

Figure 10A:
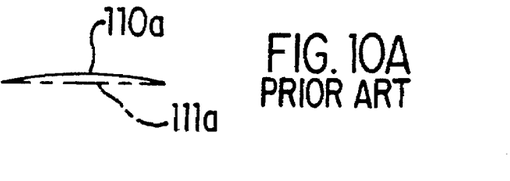
FIG. 10A illustrates the line bow phenomenon by showing a curved line of light that is formed on an original document to be read.
Figure 10B:
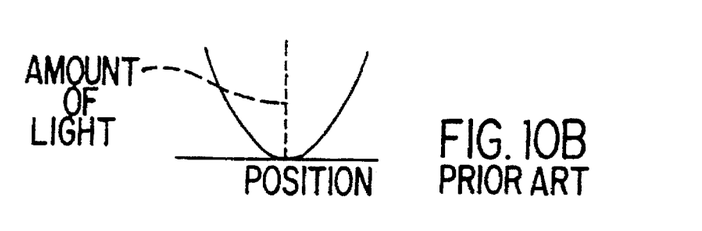
FIG. 10B is a graph showing the light quantity distribution detected by a linear CCD receiving a curved line of light.

FIG. 10A illustrates the line-bow phenomenon. Rather than forming a straight line 111a on the original document 101, a bowed line of light 110a is formed on original document 101. Accordingly, the quantity of light (shown in FIG. 10B) read by the image sensor 109 is not linear, with the problem that the quantity of light at the center and at the ends of the read line are not uniform. The graph in FIG. 10B indicates that a uniform amount of light cannot be obtained, because the amount of light at the center of the image sensor is smaller, while the amount of light at the ends of the image sensor is greater.

SUMMARY OF THE INVENTION

It is an object of the present invention to provide approximately linear illumination of the surface of an original document that is being read, and to obtain an illumination of light in which the amount of light is uniform.

In order to accomplish this and other objects, and to overcome the shortcomings detailed above, a light-supplying optical device is equipped with a light source that produces a bow-shaped line of light that becomes a straight line when reflected by a reflector such as a toric mirror, or other optical component which reflects or otherwise acts on the light produced by the light source and illuminates the original being read. Accordingly, the light source produces a bow-shaped (i.e., curved) line of light in order to nullify the line bow phenomenon caused by the optical component such as the toric mirror.

According to one embodiment, a mask having a bow-shaped (i.e., curved) slot can be provided in the light source to produce the bow-shaped line of light. According to another embodiment, the light source can have a plurality of light producing elements (e.g., LEDs) arranged in the form of a curve to produce the bow-shaped line of light. According to other embodiments, a refractory material or a prism can be provided at the output of the light source to cause a line of light initially produced in the light source (e.g., by LEDs arranged in a straight line) to become curved.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

Embodiments of the present invention are described hereafter with reference to the drawings.

Figure 1:
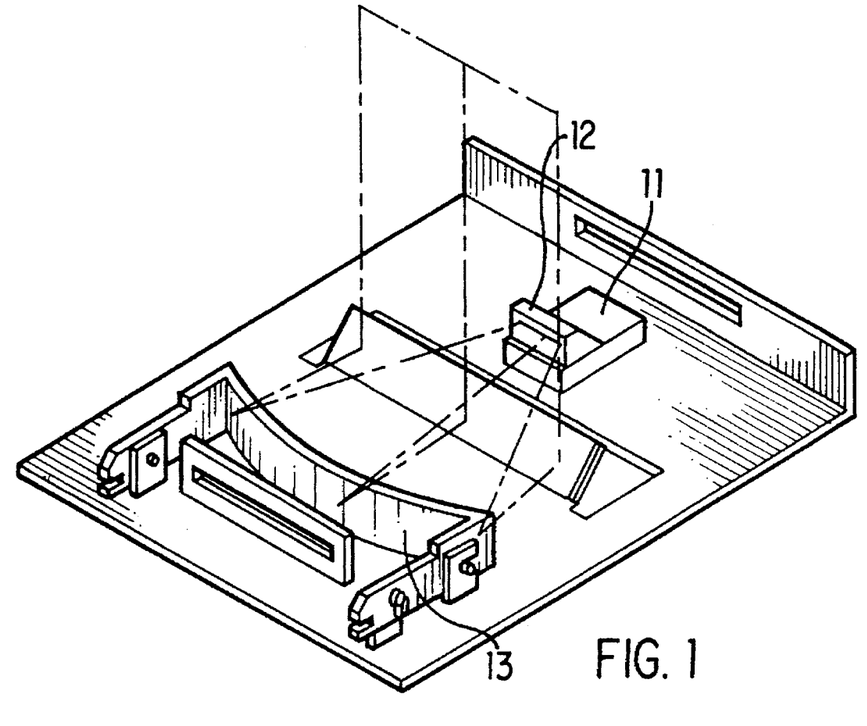
FIG. 1 is a perspective view showing a light-supplying optical device according to a first embodiment of the present invention.

FIG. 1 is a perspective top view showing a first embodiment of a light-supplying optical device according to the present invention.

In FIG. 1, an approximately bow-shaped slit 12 is formed through masking on the light-emitting surface of the light source component 11. Only light that passes through the slit 12 reaches the toric mirror 13 and is used for illumination.

When light emitted over a wide range from a light source component 11 not having slit 12 reaches the toric mirror 13 and is reflected by the toric mirror 13 (as in the conventional devices), the line of light formed on the surface of the original document (which, for example, can be a transparent film) is curved (i.e., the line bow phenomenon results).

Light that has passed through slit 12 (prior to being reflected by the toric mirror) is in the form of a curved line. Because the slit 12 is approximately bow-shaped and because the bow-shaped line of light is curved in the opposite direction when reflected by the toric mirror 13, the curved line of light produced by slit 12 is nullified by the toric mirror 13 so that the line of light formed on the surface of the original document is in the form of an approximately straight line. In other words, the curvature from the slit 12 and the curvature caused by the toric mirror 13 nullify each other, forming an approximately straight line of light on the surface of the original document. By this means, nearly uniform light reaches the reading region of the line sensor (i.e., the CCD), thereby preventing unevenness in lighting.

The line of light rays emitted from the light source travels in a first direction on a first path toward toric mirror 13. The line of light rays is curved in a direction perpendicular to the first direction due to the slit 12. After reflection by toric mirror 13, the line of light rays becomes approximately straight and travels in a second direction along a second path toward the document.

Figure 2A:
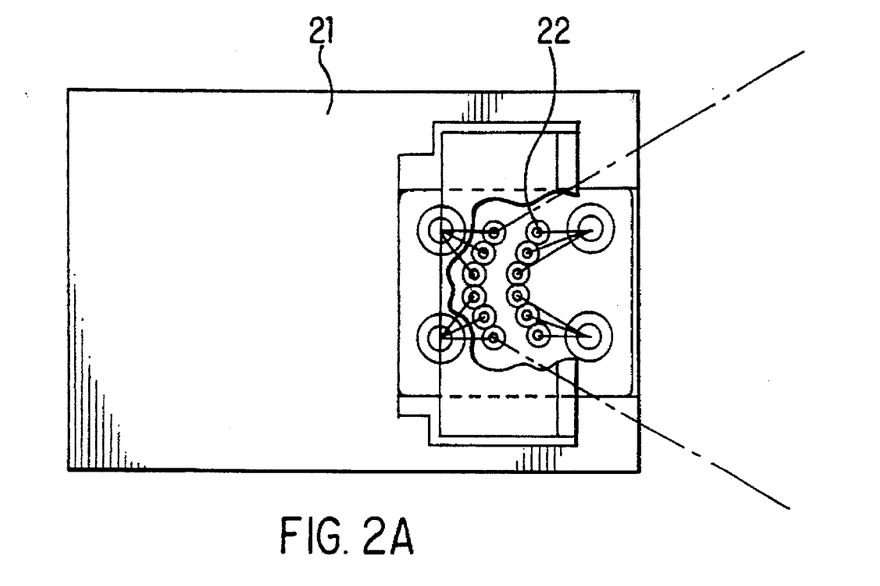
FIGS. 2A and 2B are a top view and a side view, respectively, showing a light-supplying optical device according to a second embodiment of the present invention.
Figure 2B:
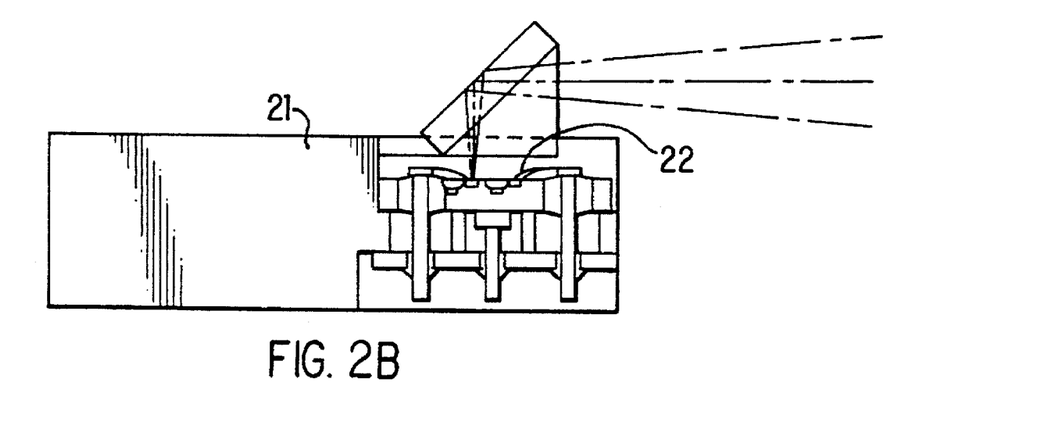

FIGS. 2A and 2B are a top view and a side view, respectively, showing a second embodiment of light-supplying optical device according to the present invention.

In the second embodiment, the arrangement of the light-emitting bodies (LEDs) 22 inside the light source component 21 is as described below. Whereas multiple light-emitting bodies are conventionally arranged in straight line rows, in the second embodiment, the light-emitting bodies 22 are arranged in an arc in the manner shown in FIG. 2A. In addition, as shown in FIG. 2B, the light-emitting bodies 22 are arranged in a three-dimensional arc also having differences in the vertical direction. The differences in the vertical position of the LEDs in each row is provided so that the distance traveled by the light emitted from all LEDs in a same row is equal. This compensates for the vertical difference between the portions of the reflecting surface used by different LEDs in each row due to the arc shape of the row (i.e., the LEDs located at the ends of each row in FIGS. 2A and 2B reflect light from a vertically higher portion of the reflector than do the central LEDs). Through this arrangement, the light source component 21 itself produces light in a line having a curved shape.

When light emitted from a light source in which the light-emitting bodies are arranged in a straight line (i.e., in the conventional manner) is reflected after reaching the toric mirror, the light illuminating the surface of the original document has a curved shape. In contrast, when light that is curved from the outset in the light source is reflected by the toric mirror, the light is curved in the opposite direction through reflection by the toric mirror, causing an approximately straight line of light to be formed on the surface of the original document. In other words, the curvature from inside the light source and the curvature caused by the toric mirror nullify each other, causing an approximately straight line of light to be formed on the surface of the film. Therefore, nearly uniform light reaches the reading region of the line sensor, preventing unevenness in lighting.

Figure 3A:
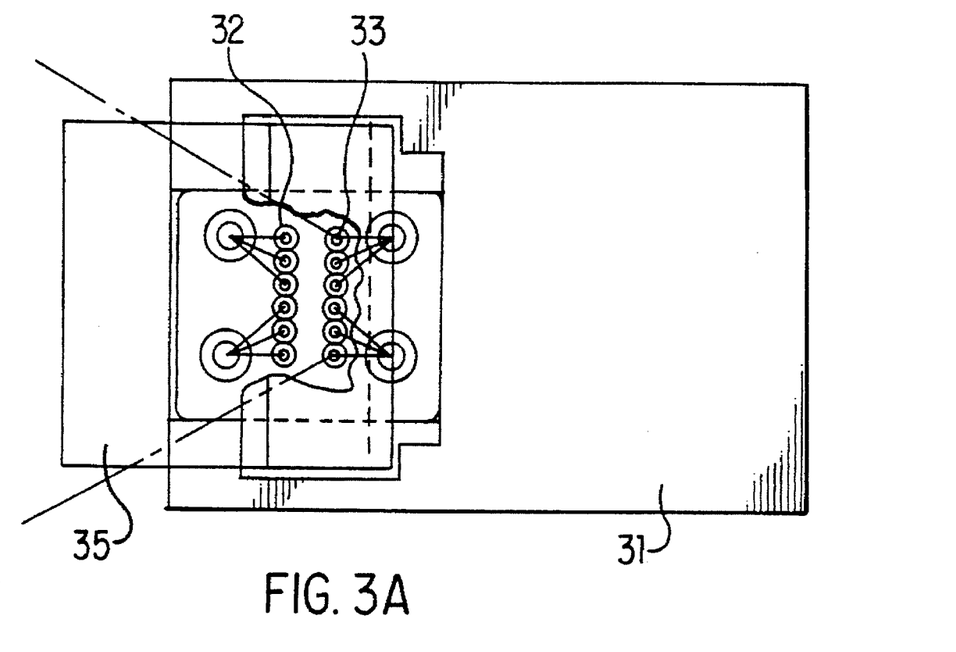
FIGS. 3A and 3B are a top view and a side view, respectively, showing a light-supplying optical device according to a third embodiment of the present invention.
Figure 3B:
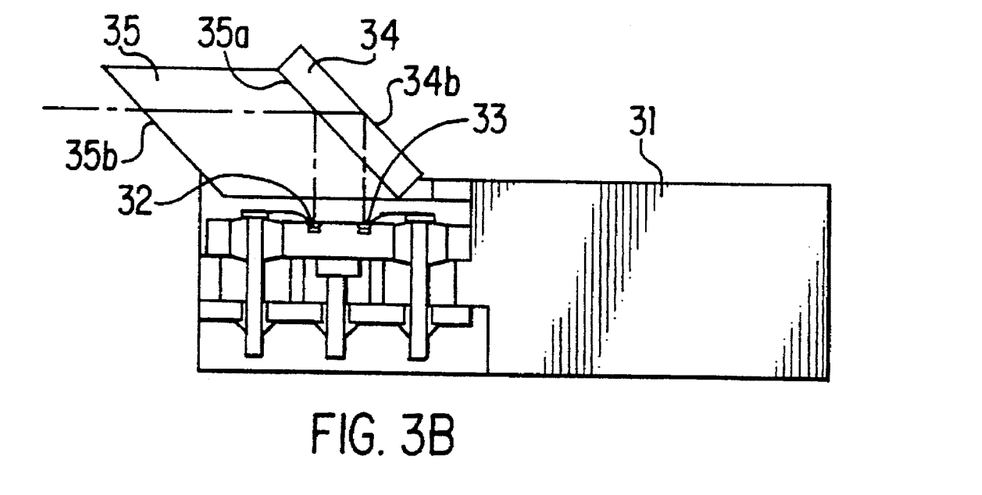
Figure 4:
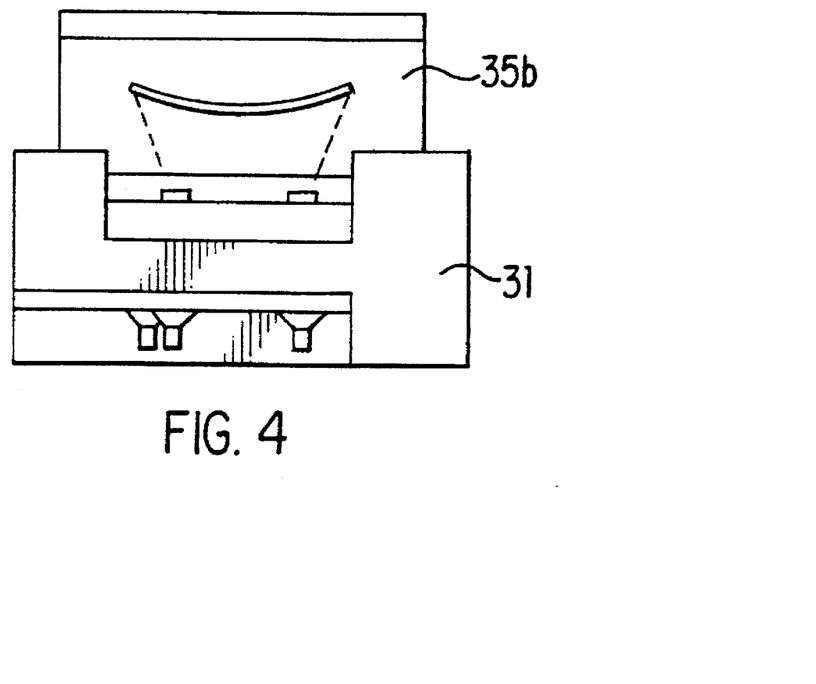
FIG. 4 is a front view showing the light-supplying optical device according to the third embodiment of the present invention.

FIGS. 3A and 3B are a top view and a side view, respectively, showing a third embodiment of a light-supplying optical device according to the present invention. In addition, FIG. 4 is a front view showing the third embodiment of the light-supplying optical device according to the present invention.

With this third embodiment, as shown in FIG. 3A, a row 32 of blue LED chips and a row 33 of red LED chips and green LED chips are provided on the base 31. On the top surface of the base 31 in the path of the light emitted from LEDs 32 and 33 are attached two optical materials 34 and 35. The light from the blue LED row 32 is reflected to the left (in FIGS. 3A and 3B) by a blue-reflecting membrane 35a. Light from the red and green LED row 33 passes through the blue-reflecting membrane 35a and is reflected to the left by the wholly reflective surface 34b of a filter 34, and again passes through the blue-reflecting membrane 35a. The line of light rays becomes a bow-shaped line of light rays, as shown in FIG. 4, because the light-emitting surface 35b of optical material 35 is slanted relative to the optical path. When the line of light rays is reflected by the toric mirror 13 (see FIG. 1), the line of light rays is curved because of the line bow phenomenon; however, the original curvature from the light source and the curvature caused by the toric mirror nullify each other, causing the line of light rays to be formed approximately in a straight line on the surface of the original document. By this means, nearly uniform light reaches the reading region of the line sensor, thereby preventing any unevenness in lighting. In addition, in the case of the third embodiment, a cost-reduction benefit also can be obtained because the optical components are parallel flat plates rather than being a prism as in the next embodiment.

Figure 5:
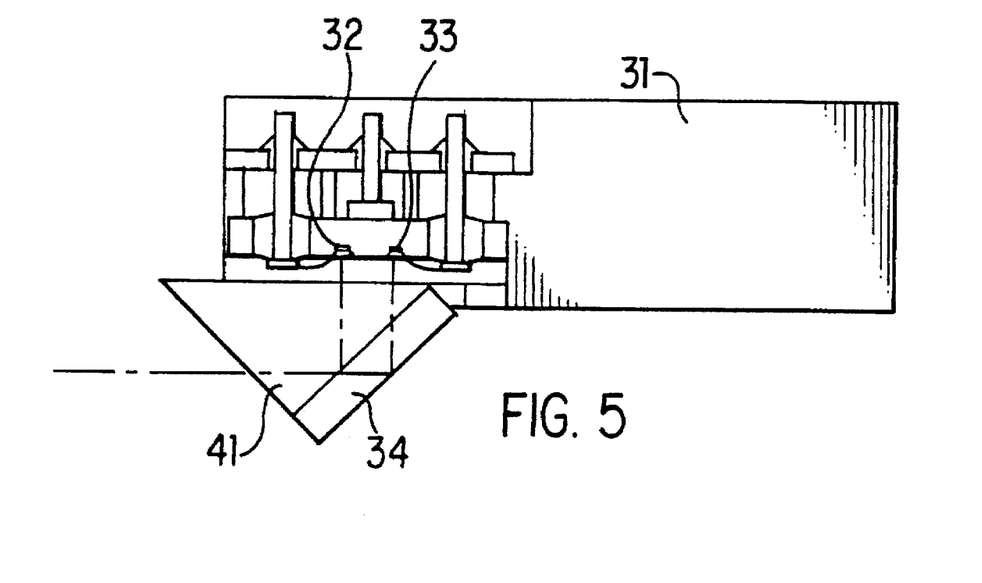
FIG. 5 is a side view showing a light-supplying optical device according to a fourth embodiment of the present invention.

FIG. 5 is a side view showing a fourth embodiment of a light-supplying optical device according to the present invention.

In the fourth embodiment, in contrast to the third embodiment, a prism 41 is used in place of the parallel flat plate optical components. Consequently, when the light source components mounted on base 31 are positioned in the optical path, the top and bottom must be reversed in comparison to the third embodiment. With the exception of these two items, the fourth embodiment is the same as the third embodiment. That is, the curvature from the light source and the curvature caused by the toric mirror nullify each other, causing the line of light rays to be formed approximately in a straight line on the surface of the original document. By this means, nearly uniform light reaches the reading region of the line sensor, thereby preventing any unevenness in lighting.

With the present invention, as set forth above, because the light source produces a bow-shaped line of light in a light-supplying optical device having the structure described above, the emitted light that is formed into a bow shape by the light source and the line bow phenomenon caused by the toric mirror nullify each other, making the light that illuminates the surface of the original document approximately in the form of a straight line, and making it possible to obtain a uniform quantity of light.

While the disclosed embodiments have described arrangements in which a toric mirror exhibited the line-bow phenomenon, the invention can be used with other types of optical components, such as certain reflectors, lenses, etc. that also exhibit the line-bow phenomenon.

It also is possible to combine any of the disclosed embodiments for forming a curved line of light. For example, a curved line of LEDs (as shown in FIGS. 2A and 2B) can be used in combination with a refractory material (FIGS. 3A and 3B) or with a prism (FIGS. 5). Additionally, the FIG. 1 slit can be used in combination with the other embodiments.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A light-supplying optical device comprising:
   a light source that produces an elongated line of light that travels in a first direction along a path, said elongated line of light having a curved shape when viewed in said first direction;
   a reflector located in said path to reflect the curved line of light produced by said light source toward a planar surface;
   wherein the curved elongated line of light produced by said light source nullifies a line bow phenomenon of the reflector so that a substantially straight elongated line of light is formed on the planar surface.

2. The light-supplying optical device of claim 1, wherein said light source includes a member having a curved elongated slit that produces said curved elongated line of light.

3. The light-supplying optical device of claim 1, wherein said light source includes multiple point light producing components arranged in at least one curved elongated line to produce said curved line of light.

4. The light-supplying optical device of claim 3, wherein said multiple point light producing components are multiple light-emitting-diodes.

5. The light-supplying optical device of claim 3, wherein at least some of said multiple point light producing components are positioned at a different vertical position than others of said multiple point light producing components.

6. The light-supplying optical device of claim 1, wherein said light source includes a light producing source that produces an elongated line of light along a first path, and an optical member located in said first path to receive said elongated line of light from said light producing source and to output said curved elongated line of light along said path.

7. The light-supplying optical device of claim 6, wherein said elongated line of light produced by said light producing source is a substantially straight line of light.

8. The light-supplying optical device of claim 6, wherein said optical member includes a member comprised of a refractory material.

9. The light-supplying optical device of claim 6, wherein said optical member includes a prism.

10. The light-supplying optical device of claim 1, wherein said reflector is a toric mirror.

11. The light-supplying optical device of claim 1, wherein said surface is an original document.

12. A light-supplying optical device comprising:
    light producing means for producing an elongated line of light that is output along a first path in a first direction, said elongated line of light being curved in a second direction orthogonal to said first direction so that said elongated line of light has a curved shape when viewed in said first direction;
    reflecting means, located in said first path, for bending lines of light while reflecting said lines of light, said reflecting means bending said curved elongated line of light during reflection to produce a substantially straight elongated line of light, said substantially straight elongated line of light being projected along a second path toward a planar surface so that a substantially straight elongated line of light is formed on the planar surface.

13. The light-supplying optical device of claim 12, wherein said light producing means includes at least one light-producing element that emits light along said first path, and a mask located in said first path and including a curved elongated slit that produces said curved elongated line of light.

14. The light-supplying optical device of claim 12, wherein said light producing means includes multiple point light producing components.

15. The light-supplying optical device of claim 14, wherein said multiple point light producing components are arranged in at least one curved line to produce said curved elongated line of light.

16. The light-supplying optical device of claim 15, wherein at least some of said multiple point light producing components are positioned at a different vertical position than others of said multiple point light producing components.

17. The light-supplying optical device of claim 12, wherein said light producing means includes at least one light-producing element that produces an elongated line of light along an output path, and optical means, located in said output path, for bending said elongated line of light produced by said at least one light-producing element to output said curved elongated line of light along said first path.

18. The light-supplying optical device of claim 17, wherein said optical means includes a member comprised of a refractory material.

19. The light-supplying optical device of claim 17, wherein said optical means includes a prism.

20. The light-supplying optical device of claim 17, wherein said elongated line of light produced by said at least one light-producing element is a substantially straight line of light.

21. The light-supplying optical device of claim 20, wherein said at least one light-producing element is at least one row of light-emitting-diodes arranged in a substantially straight line.

22. In a document illumination system in which an elongated line of light is formed on a surface of a document after passing through a light path having at least one optical component, a light-supplying optical device comprising:

a light source that outputs an elongated line of light in a first direction into said path, said elongated line of light being curved in a second direction orthogonal to said first direction so that said elongated line of light has a curved shape when viewed in said first direction;

the at least one optical component being located between the light source and the document and receiving the curved elongated line of light from the light source and bending the curved elongated line of light to form a straight elongated line of light on the surface of the document.

23. The system of claim 22, wherein said light source includes a member having a elongated curved slit that produces said curved elongated line of light.

24. The system of claim 22, wherein said light source includes multiple point light producing components arranged in at least one curved line to produce said curved elongated line of light.

25. The system of claim 22, wherein said light source includes a light producing source that produces an elongated line of light along a first path, and an optical member located in said first path to receive said elongated line of light from said light producing source and to output said curved elongated line of light into said path.

26. The system of claim 25, wherein said optical member includes a member comprised of a refractory material.

27. The system of claim 25, wherein said optical member includes a prism.

28. The system of claim 25, wherein said light producing source outputs a straight line of light.

29. The system of claim 22, wherein said at least one optical component includes a toric mirror that bends said curved elongated line of light while reflecting said curved elongated line of light to form the straight elongated line of light on said surface of said document.

30. The system of claim 29, wherein said at least one optical component further includes an optical path changing mirror located between said toric mirror and said document.

31. A method of forming a substantially straight line of light onto a document in a device having at least a light producing source that outputs an elongated line of light along a first path in a first direction, and a reflecting member located in said first path that reflects the elongated line of light along a second path toward a surface of said document, said method comprising the step of:

outputting said elongated line of light from said light source so that said elongated line of light is curved in a second direction orthogonal to said first direction so that said elongated line of light has a curved shape when viewed in said first direction.

32. The method of claim 31, wherein said curved elongated line of light is output by passing light produced by at least one light producing element through a curved elongated slit.

33. The method of claim 31, wherein said curved elongated line of light is output by arranging multiple point light producing components that comprise said light producing source in at least one curved line to produce said curve elongated line of light.

34. The method of claim 33, wherein at least some of said multiple point light producing components are positioned at a different vertical position than others of said multiple point light producing components.

35. The method of claim 31, wherein said curved line of light is output by passing an elongated line of light through an optical member that bends said line of light to produce said curved elongated line of light along said first path.

36. The method of claim 35, wherein said optical member includes a member comprised of a refractory material.

37. The method of claim 35, wherein said optical member includes a prism.

38. The method of claim 31, wherein said reflecting member is a toric mirror.

* * * * *